United States Patent [19]

Köhler et al.

[11] 4,123,501
[45] Oct. 31, 1978

[54] OXIDATION OF METALLIC IRON TO BLACK OXIDE PIGMENTS

[75] Inventors: Klaus Köhler; Peter Woditsch; Karl-Heinz Schultz, all of Krefeld, Germany

[73] Assignee: Bayer Aktiengesellschaft, Leverkusen, Germany

[21] Appl. No.: 787,729

[22] Filed: Apr. 14, 1977

[30] Foreign Application Priority Data

Apr. 22, 1976 [DE]  Fed. Rep. of Germany ....... 2617569

[51] Int. Cl.² .................................................. C01G 49/02
[52] U.S. Cl. ........................................ 423/152; 423/632
[58] Field of Search ................. 423/140, 151, 152, 632

[56] References Cited

U.S. PATENT DOCUMENTS

| | | | |
|---|---|---|---|
| 1,368,748 | 2/1921 | Penniman et al. | 423/633 |
| 2,045,807 | 6/1936 | Smyly | 423/632 |
| 2,133,267 | 10/1938 | Ayers | 423/632 |
| 3,692,683 | 9/1972 | Geus | 423/632 |
| 3,734,996 | 5/1973 | Bade et al. | 423/632 |
| 4,024,232 | 5/1977 | Garberi et al. | 423/632 |

FOREIGN PATENT DOCUMENTS

| | | | |
|---|---|---|---|
| 2,029,300 | 6/1970 | Fed. Rep. of Germany | 423/632 |
| 3,713,456 | 9/1962 | Japan | 423/632 |

*Primary Examiner*—O. R. Vertiz
*Assistant Examiner*—Wayne A. Langel
*Attorney, Agent, or Firm*—Burgess, Dinklage & Sprung

[57] ABSTRACT

A metallic iron-containing starting material such as iron filings, iron powder or a reduced ore such as ilmenite is oxidized with air in the presence of 5 to 40% of iron oxide and/or iron oxide hydroxide nuclei and about 2.5 to 200% of an electrolyte, percentages being based on metallic iron by weight. The oxidation is effected in aqueous suspension at 75° to 100° C and a pH of 4 to 6.5. If the nuclei are magnetite-free, at least the first quarter of the oxidation should be at pH 5 to 6.5. Preferred electrolytes are transition metal salts. The pigments are more intense in color and have a more pronounced blue tinge.

5 Claims, No Drawings

OXIDATION OF METALLIC IRON TO BLACK OXIDE PIGMENTS

This invention relates to a process for the preparation of black iron oxide pigments having a spinel structure in which the formation of $Fe_3O_4$ pigment is carried out in the presence of finely divided iron oxide nuclei and of metallic iron at a pH of between about 4 and 6.5 and at temperatures above about 75° by oxidation with an oxygen-containing gas with addition of an electrolyte in the aqueous phase. The process according to the invention is suitable for direct conversion of scrap iron or of reduced ores containing iron, for example reduced ilmenite, into black pigments, formation of unwanted by-products being largely avoidable.

It is known, for example, to prepare $Fe_3O_4$ black pigments by the so-called precipitation process. This may be carried out either as a one-step or two-step process. In the one step process, an iron sulfate solution is completely precipitated with alkali metal hydroxide and oxidized to $Fe_3O_4$ with oxidizing agents under heat, optionally under pressure, until the theoretical Fe(II)/Fe(III) ratio has been obtained (U.S. Pat. No. 3,141,738). In the two step process, about 60% to 70% of a ferrous salt are precipitated from solution at room temperature in the first stage and oxidized to goethite. In the second step of the process, the remaining ferrous ions in the suspension are precipitated by further addition of alkali at 70° C to 100° C to form $Fe_3O_4$ (for example German Offenlegungsschrift No. 2,508,155). The disadvantage of the precipitation processes lies in the amount of salt carried in the effluent.

The method of preparation named after Penniman (U.S. Pat. No. 1,368,748) has become known for the preparation of iron yellow pigments ($\alpha$-FeOOH) and iron red pigments ($\alpha$-$Fe_2O_3$). The formation of unwanted side products in the form of salts is in this case very slight. In this known process, metallic iron is oxidized to $Fe_2O_3$ or FeOOH with oxygen-containing gases such as air at temperatures of about 50° to 100° C in the presence of an electrolyte and suspensions of iron oxide or iron oxide-hydroxide nuclei in an acid medium (pH about 3 to 6) (German Offenlegungsschrift No. 2,029,300).

It was not hitherto known that iron oxide black pigments could also be prepared directly by oxidation of metallic iron with oxygen-containing gases in aqueous suspension.

It has now surprisingly been found that the conversion of metallic iron into iron oxide pigments can be carried out in such a manner that black pigments having a spinel structure are obtained.

The present invention thus provides a process for the preparation of black pigments by oxidation with air of an iron-containing starting material in aqueous suspension followed by separation of the pigment and drying, characterized in that metallic iron is oxidized to $Fe_3O_4$ pigment by gasification with oxygen-containing gases in the presence of finely divided iron oxide nuclei and/or iron hydroxide nuclei in quantities of about 5 to 40% by weight and at least one electrolyte in quantities of about 2.5 to 200% by weight, in each case based on the quantity of metallic iron, at a pH of about 4 to 6.5 and at temperatures above about 75° C, preferably about 80° C to 100° C, with the further condition that if the iron oxide nuclei used are nuclei which do not have a magnetite structure, pH values of between about 5.0 and 6.5 are maintained during the first quarter of the pigment formation.

If iron fillings or a finely divided iron powder is used in the process according to the invention, the pigment is obtained in its pure form and is ready for use after filtration and optionally after washing and drying. If metallic iron is used in the form of a reduced ore, e.g. reduced ilmenite, the black pigment obtained must be separated from the titanium dioxide portion by decanting, sieving or similar measures. Conversion of the metallic iron in the reduced ore to pigment is virtually quantitative under the given conditions so that the process according to the invention is particularly suitable for removing the iron component from ores. In this way reduced ilmenite ores, for example, can be worked up to high quality $TiO_2$ concentrates with $TiO_2$ contents of up to about 96% which can be used directly for chlorination to titanium tetrachloride. An ilmenite having particle sizes of about 70 to 250 $\mu m$ is preferably first pretreated by a preliminary oxidation with oxygen-containing gases at temperatures of about 800° to 1100° C in known apparatus such as rotary furnaces or cyclone ovens. This preoxidized ilmenite is then reduced by the action of reducing agents such as lignite or hydrocarbons at temperatures of about 700° C to 1200° C. If desired, however, preoxidation of the ilmenite may be omitted and the ore may simply be reduced to metallic iron by known methods to recover its iron content. The reduced ilmenite not containing metallic iron may, for example, be converted into a high percentage $TiO_2$ concentrate by treatment in stirrer vessels to produce iron oxide black pigments by the process according to the invention. In this way, the iron content of the ore is obtained in the form of valuable iron oxide black pigments after the process of pigment formation.

It has been found that when pigments are produced by the process according to the invention, the nature of the iron oxides used as nuclei does not influence the nature of the phase formed. When pigment formation is carried out under the conditions according to the invention, iron oxide black with a spinel structure is obtained regardless of the crystal structure or phase, identifiable by X-rays in which the nuclei exist. This means that either iron red nuclei ($\alpha$-$Fe_2O_3$ nuclei) or iron oxide hydroxide compounds in the form of $\alpha,\beta$ or $\gamma$-FeOOH may be used as the nuclei. Methods of preparing such nuclei are known, for example Penniman's method of $\alpha$-FeOOH pigment formation or the precipitation process. The preparation of exceptionally finely divided $\alpha$-$Fe_2O_3$ nuclei has been described, for example, in German Offenlegungsschrift No. 2,249,274. Methods of preparing FeOOH nuclei may be found, for example in the following Patent Specification: German Offenlegungsschrift No. 2,249,274, DDR Patent Specification No. 61,582 and U.S. Pat. No. 2,560,970 and No. 2,111,726.

Instead of using nuclei of an alien phase, it is also possible to use very finely divided $Fe_3O_4$ particles as nuclei of the same species. Nuclei of this kind can be obtained, for example, when iron salt solutions containing a ratio of ferrous to ferric irons of between about 1:1.6 and 1:2.4 are precipitated with an alkali at a pH up to about 9 at a temperature of about 90° C. Another method consists of adding alkali tp ferrous salt solutions until a pH of about 8 to 11 is reached and oxidizing with air at 90° C. When alien nuclei are used in the process according to the invention, that is to say nuclei such as $\alpha$, $\beta$ or $\gamma$-FeOOH or $\alpha$-$Fe_2O_3$, the pH should be adjusted to values of about 5.0 to 6.5 during the first quarter of the time of pigment formation.

In the process according to the invention, the nuclei are used in quantities of about 5 to 40% by weight, preferably about 8 to 20% by weight, based on the quantity of metallic iron.

Whereas the black pigments obtained by the process according to the invention have a cubic spinel structure regardless of the nuclear phase used, the intensity of color and to a certain extent also the color tone are influenced by the fineness of subdivision of the nuclei. The more finely divided the nuclei used, the greater may be the growth allowed during pigment formation. High growth rates, measured by the quantity of iron oxide formed during preparation of the pigment in proportion to the quantity of iron oxide put into the process as nuclei, are particularly beneficial in rendering the process of pigment formation harmless to the environment. Since formation of nuclei is invariably carried out by precipitation of iron salts with alkali, a certain quantity of salt is present in the process according to the application. The higher the growth rate in the course of pigment formation in relation to the quantity of nuclei supplied, the larger is the quantity of pigment which can be prepared by solution of the metallic iron and its oxidation.

The presence of electrolyte solutions is essential to the process according to this application. Various compounds may be used for these solutions, provided they are soluble within the pH and temperature range necessary for the process according to the invention. Examples include salts of the transition metals in the pure form or in any mixtures and equally suitable are salts of a weak base with a strong acid which give rise to the necessary pH range according to the invention by partial hydrolysis. The following are examples of electrolytes which may be used according to the invention: $FeSO_4.7H_2O$, $FeCl_2.4H_2O$, $NiSO_4.7H_2O$, $CoSO_4.7H_2O$, $CuSO_4.5H_2O$, $NH_4Cl$, $(NH_4)_2SO_4$, $CH_3COOH$, $HCOOH$, $HOOC(CH_2)_3COOH$, $H_2SO_4$, $HCl$, and $HNO_3$. The following are preferred: $FeSO_4.7H_2O$, $FeCl_2.4H_2O$, $(NH_4)_2SO_4$, $CH_3COOH$, $H_2SO_4$, $HCl$ and $HNO_3$.

The following are particularly preferred: $FeSO_4.7H_2O$, $H_2SO_4$ and $CH_3COOH$.

The concentration of electrolytes may vary over a wide range without affecting pigment formation. A certain minimum content of the order of about 2.5% by weight based on the quantity of metallic iron is necessary. It is preferred to use about 5 to 40% by weight, based on the quantity of metallic iron, so that pigment formation can proceed at a technically and economically advantageous overall velocity. Higher concentrations may also be used but bring no advantages to the process.

In one special embodiment for carrying out the process of pigment formation according to the invention in the presence of iron salts, the electrolyte required for the process may be prepared in the suspension of nuclei itself at the beginning of pigment formation by adding a suitable quantity of acid after addition of the metallic iron so that the reaction between the acid and iron results in the desired iron salt concentration. Any inorganic or organic acids which do not give rise to compounds which are only soluble with difficulty are suitable for this purpose, e.g. sulfuric acid, hydrochloric acid, nitric acid or acetic acid.

It is not important to the process according to the invention in what sequence the suspension of nuclei, electrolyte solution and metallic iron are added.

In one preferred embodiment, a suspension containing finely divided $Fe_3O_4$ or $Fe_2O_3$ or $FeOOH$ particles as nuclei (size of nuclei approximately 60 to 600 and preferably 100 to 300 Angstrom units) is heated to the required temperature, the electrolyte salt solution is added and the metallic iron is then introduced, for example in the form of reduced ilmenite or iron powder.

A guide to the velocity of pigment formation is the volume/time yield which is defined as the quantity of pigment prepared per unit time and unit volume. In the process according to the invention, $Fe_3O_4$ with spinel structure is formed regardless of the volume/time yield, which is between about 1 and 12 g/l per hour. The velocity of magnetite formation, which is characterized by the volume time yield, is dependent upon the pH and the temperature. In order to obtain iron oxide black pigments, these parameters can be varied as desired within the range demanded according to the invention. The pH required for pigment formation is adjusted by the quantity of oxygen-containing-gas introduced, which is preferably air. Any increase in the quantity of gas supplied causes a drop in the pH and hence an increase in volume/time yields and conversely. The pH values given are based on measurement of the pH with a glass electrode.

The reaction vessels used for the process according to the invention may be any apparatus which ensure thorough dispersion of the solid particles present in the suspension and good distribution of the oxygen-containing gas in the liquid phase. According to one preferred embodiment, a suspension containing finely divided iron oxide or oxide-hydroxide nuclei at a concentration, converted to Fe(III), of about 3 g/l to 8 g/l is introduced into an electrically heated steel vessel (remanite) equipped with gasification stirrer and contact thermometer. Electrolyte salt either in the solid form or dissolved in water is added in the quantity required to produce a 0.01 to 1 molar electrolyte salt solution within the suspension of nuclei. The contents of the vessel are heated to temperatures above 75° C, metallic iron in the form of powder or filings or reduced ore containing an equivalent quantity of metallic iron is added with stirring and the contents are charged with air. Instead of a gasification stirrer, any other efficient stirrer may be used, and in that case the reaction vessel is provided with a gas inlet pipe. The time required for pigment formation is about 7 to 30 hours. Preparation of the pigment is followed by the usual operations such as filtration or decantation from ore if used, followed by drying of the black pigment at temperatures of about 80 to 110° C in the usual drying apparatus such as vacuum drying cupboards, hot drying cupboards or spray driers.

If desired, the black pigments obtained may be converted into red pigments with an $\alpha$-$Fe_2O_3$ structure or magnetic $\gamma$-$Fe_2O_3$ pigments by a simple process of calcination at temperatures of about 300° to 900° C.

The pigments prepared by the process according to the invention are at least equal in their intensity of color to products prepared by known processes and they generally have an intenser color with a more pronounced blue tinge.

For colorimetric assessment of the black pigments prepared according to the invention, Ultramoll-mixtures were prepared using a white standard and measured in a three filter apparatus and the color intensity and color location in the Adams-Nickerson (AN) system calculated. A commercial iron oxide black pigment was used for comparison. It was found that pigments prepared according to the invention had a substantially intenser color and in most cases also a more pronounced blue tinge.

The Fe(II)/Fe(III) ratio in the black pigments prepared according to the invention is controlled by the conditions employed to be preferably within the range of between about 1:2.0 and 1:2.8. Radiographic phase control shows that uniform products with a magnetite structure are obtained. Electron optical photographs show isometric particles with a very narrow range of particle sizes.

The following Examples serve to explain the process of the invention.

hours, the pH had dropped to 4.0 and all the metallic iron had been used up. The black pigment obtained was passed through a 0.71 μm sieve to remove ore concentrate ($Fe_{met.} < 0.1\%$), filtered, washed until salt free and dried in a vacuum drying cupboard at 80° C. The magnetite obtained was found to contain 26.1% of FeO and 66.5% of $Fe_2O_3$ (corresponding to an Fe(II)/Fe(III) ratio of 1:2.29) and the volume/time yield was found to be 2 g/l/h. (Color intensity 1.) 180%, color tinge 2.) 0,2 violet).

The procedure adopted in the following examples was the same as in Example 1 so that it is sufficient to give the most important numerical data of the reactions. The course of the reaction is briefly outlined by the reaction time, quantity of air added and corresponding pH values. Any procedure differing from that employed in Example 1 is pointed out.

| Ex. | Suspension of nuclei | Electrolyte | Iron Raw material | Temp. (° C) | Reaction time (h) | pH | Air (l/h) | Vol/time yield (g/l/h) | Fe(III) FE(II) | Color intensity (%)[1] | Color tinge[2] |
|---|---|---|---|---|---|---|---|---|---|---|---|
| 2 | 13 l α-FeOOH 3.4 g/l Fe(III) | 11.7 g/l $FeSO_4$ | 2.5 kg reduced ilmenite | 90 | 20 | 5.0–4.1 | 20–40 | 2.7 | 2.21 | 130 | 1.0 blue |
| 3 | 13 l Γ-FeOOH 5.3 g/l Fe(III) | 14.9 g/l $FeCl_2$ | " | " | 12 | 5.1–4.0 | 25–100 | 3.7 | 2.71 | 150 | 0.3 violet |
| 4 | 12.5 l $Fe_3O_4$ 2.0 g/l Fe(II) 4.5 g/l Fe (III) | 15.0 g/l $FeSO_4$ | " | " | 21 | 5.4–4.2 | 15–80 | 2.4 | 2.25 | 150 | 0.5 blue |
| 5 | 12.5 l α-$Fe_2O_3$ 5.6 g/l Fe(III) | 14.8 g/l $FeSO_4$ | " | 80 | 20 | 5.1–4.1 | 17–36 | 2.4 | 2.38 | 140 | 0.3 violet |
| 6 | 13.5 l α-$Fe_2O_3$ 5.7 g/l Fe(III) | 16.3 g/l $FeSO_4$ | 675 g fine iron powder | 90 | 16 | 5.3–4.0 | 25–93 | 2.4 | 2.21 | 170 | 0.3 violet |
| 7 | 12.5 l α-$Fe_2O_3$ 6.1 g/l Fe(III) | 100.0 g/l $FeSO_4$ | 2.5 kg reduced ilmenite | " | 8 | 4.6–4.0 | 30–100 | 5.3 | 2.38 | 180 | 0.4 violet |
| 8 | 12.5 l α-$Fe_2O_3$ 6.7 g/l Fe(III) | 15.2 g/l $CoSO_4$ | 2.5 kg reduced ilmenite | 90 | 12 | 5.0–4.0 | 13–73 | 3.8 | 2.88 | 180 | — |
| 9 | 12.5 l α-$Fe_2O_3$ 5.5 g/l Fe(III) | 15.2 g/l $NiSO_4$ | " | " | 7 | 5.2–4.6 | 17–210 | 7.4 | 2.68 | 220 | 1,1 red |
| 10 | 12.5 l α-$Fe_2O_3$ | 15.0 g/l $(NH_4)_2SO_4$ | " | " | 15 | 6.0–5.6 | 17–100 | 3.1 | 2.71 | 190 | 0,5 orange |
| 11 | 12.5 l α-$Fe_2O_3$ 6.9 g/l Fe(III) | 6 g/l acetic acid | " | " | 8 | 5.2–4.5 | 15–100 | 6.1 | 2.77 | 160 | 1,0 blue |
| 12 | 12.5 l α-$Fe_2O_3$ 7.6 g/l Fe(III) | 35 g/l 28% $H_2SO_4$ | " | " | 16 | 5.0 4,0 | 17–35 | 2.7 | 2.41 | 150 | 0,2 violet |

[1] Color intensity in relation to tested commercial produce (100%)
[2] Expressed as color tone on the Adams-Nickerson (AN) system referred to comparison product in units of $\Delta E_{AN}$.

EXAMPLE 1

12.5 liters of a suspension of α-$Fe_2O_3$ nuclei (containing 5.3 g/l of Fe(III) prepared by a known process were introduced into an electrically heatable 18 l refined steel vessel equipped with a gasification stirrer and a contact thermometer. 420 g of $FeSO_4.7H_2O$ were added and the mixture was heated to 90° C. When this temperature had been reached, 2.5 kg of an ilmenite ($Fe_{met.} = 27\%$) which had been preoxidized in known manner and then reduced and passed through a 0.71 μm sieve to remove fine constituents were added and the mixture was gasified with 25 l per hour of air with stirring (960 revs/min), the pH becoming established at 4.85 to 5.10. After 19 hours, the pH began to drop and the rate of supply of air was reduced to 17 l/h. After a reaction time of 24

It will be appreciated that the instant specification and examples are set forth by way of illustration and not limitation, and that various modifications and changes may be made without departing from the spirit and scope of the present invention.

What is claimed is:

1. A process for the preparation of a black pigment comprising oxidizing a metallic iron-containing starting material in aqueous suspension with an oxygen-containing gas in the presence of about 5 to 40% of finely divided $Fe_3O_4$ nuclei of magnetite structure and about 2.5 to 200% of at least one electrolyte, percentages being by weight of metallic iron, at a pH of about 4 to 6.5 and a temperature of about 75° C to 100° C, and separating the resultant $Fe_3O_4$ pigment from the aqueous medium.

2. The process according to claim 1, wherein the electrolyte comprises at least one salt of a transition metal.

3. The process according to claim 1, wherein the metallic iron-containing starting material is finely divided iron filings, iron powder or reduced iron oxide ore.

4. The process according to claim 1, wherein the metallic iron-containing starting material is reduced ilmenite.

5. The process according to claim 1, wherein the metallic iron-containing starting material is finely divided iron filings, iron powder or reduced iron oxide ore, the oxidation is carried out at a temperature of about 80° to 100° C, and the nuclei are present in about 8 to 20% by weight.

* * * * *